United States Patent
Xu et al.

(10) Patent No.: US 12,503,519 B2
(45) Date of Patent: Dec. 23, 2025

(54) ANTI-PHENACETIN MONOCLONAL ANTIBODY HYBRIDOMA CELL STRAIN AD AND ITS PREPARATION METHOD AND APPLICATION

(71) Applicant: JIANGNAN UNIVERSITY, Jiangsu (CN)

(72) Inventors: Chuanlai Xu, Jiangsu (CN); Jingjing Yao, Jiangsu (CN); Hua Kuang, Jiangsu (CN); Liguang Xu, Jiangsu (CN); Maozhong Sun, Jiangsu (CN); Xiaoling Wu, Jiangsu (CN); Liqiang Liu, Jiangsu (CN); Wei Ma, Jiangsu (CN); Jianping Zhu, Jiangsu (CN); Changlong Hao, Jiangsu (CN); Shanshan Song, Jiangsu (CN); Yongming Hu, Jiangsu (CN); Aihong Wu, Jiangsu (CN); Lingling Guo, Jiangsu (CN); Xinxin Xu, Jiangsu (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 851 days.

(21) Appl. No.: 17/779,989

(22) PCT Filed: Nov. 9, 2021

(86) PCT No.: PCT/CN2021/129509
§ 371 (c)(1),
(2) Date: May 25, 2022

(87) PCT Pub. No.: WO2022/183762
PCT Pub. Date: Sep. 9, 2022

(65) Prior Publication Data
US 2023/0167196 A1    Jun. 1, 2023

(30) Foreign Application Priority Data
Mar. 1, 2021    (CN) .......................... 202110226325.1

(51) Int. Cl.
*C07K 16/44*    (2006.01)
*G01N 33/94*    (2006.01)

(52) U.S. Cl.
CPC .......... *C07K 16/44* (2013.01); *G01N 33/9486* (2013.01); *C07K 2317/92* (2013.01); *G01N 2470/10* (2021.08)

(58) Field of Classification Search
None
See application file for complete search history.

(56) References Cited

FOREIGN PATENT DOCUMENTS

| | | |
|---|---|---|
| CN | 108866006 A | 11/2018 |
| CN | 112877296 A | 6/2021 |
| CN | 113248398 A | 8/2021 |
| CN | 113248596 A | 8/2021 |
| WO | 2001011035 A1 | 2/2001 |

OTHER PUBLICATIONS

Mitra S. and Tomar PC., "Hybridoma technology; advancements, clinical significance, and future aspects", J Genet Eng Biotechnol. Oct. 18, 2021;19(1):159. (Year: 2021).*

* cited by examiner

*Primary Examiner* — Daniel E Kolker
*Assistant Examiner* — Peter Johansen
(74) *Attorney, Agent, or Firm* — HAUPTMAN HAM, LLP

(57) ABSTRACT

The invention discloses an anti-phenacetin monoclonal antibody hybridoma cell strain AD, a preparation method and application thereof, and relates to the technical field of food safety immunodetection. The monoclonal antibody hybridoma cell strain is named monoclonal cell strain AD and the number CGMCC19681. The Phe-BA obtained by the hydrolysis of the reaction product of the phenacetin metabolite acetaminophen and ethyl 4-bromobutyrate is used as the hapten, and the hapten is coupled with the carrier protein to prepare the immunogen Phe-BA-BSA. After the mice were immunized with the immunogen Phe-BA-BSA, they were fused with myeloma cells by PEG method, screened by indirect competitive enzyme-linked immunosorbent assay and subcloned five times to obtain hybridoma cell lines. The monoclonal antibody secreted by the cell line can be made into a phenacetin detection kit, which has good affinity and detection sensitivity for phenacetin, and can be used for immunodetection of phenacetin residues in food.

3 Claims, 2 Drawing Sheets

ANTI-PHENACETIN MONOCLONAL ANTIBODY HYBRIDOMA CELL STRAIN AD AND ITS PREPARATION METHOD AND APPLICATION

RELATED APPLICATIONS

This is a U.S. national stage of international application No. PCT/CN2021/129509 filed on Nov. 9, 2021, which claims priority from China Patent Application No. 202110226325.1 filed on Mar. 1, 2021, the entire content of which is incorporated by reference.

TECHNICAL FIELD

The invention relates to an anti-phenacetin monoclonal antibody hybridoma cell strain AD and its preparation method and application, and belongs to the field of food safety immunoassay.

BACKGROUND

Phenacetin (Phe) belongs to nonsteroidal anti-inflammatory drugs (NSAIDs), which has anti-inflammatory, analgesic, and antipyretic effects. It is widely used clinically to relieve a variety of fever and various pain symptoms. NSAIDs are currently one of the most widely used drug classes in the world. About 30 million people use it every day around the world. With the increasing use of NSAIDs, drug safety issues have also attracted more and more attention. The US Food and Drug Administration (FDA) believes that NSAIDs have the potential risk of cardiovascular and gastrointestinal bleeding, which makes the safe use of NSAIDs become a hot issue in the global pharmaceutical industry. Despite extensive epidemiological evidence that phenacetin abuse is a risk factor for renal pelvis cancer, the genetic changes of tumors caused by phenacetin abuse remain unclear. In recent years, some countries have withdrawn from the market because of its side effects. At present, phenacetin is still used to treat the antipyretic and analgesic symptoms of small animals. Therefore, it is of great significance and market value to establish a rapid and effective method to detect the content of phenacetin.

The efficient and sensitive detection method of phenacetin is an urgent problem to be solved. The current detection methods include immunoassay and instrumental analysis. Instrumental analysis methods such as high performance liquid chromatography, high performance liquid chromatography tandem mass spectrometry, etc., due to the cumbersome sample pretreatment, many interfering substances and limitations of instrument working conditions, and high technical requirements for operators, are not suitable for current use. Compared with instrument detection methods, immunoassay methods have the characteristics of low cost, high throughput, high sensitivity, and low requirements for technicians. It is suitable for rapid screening of a large number of samples. Therefore, the immunoassay method is of great significance for the detection of phenacetin.

Enzyme-linked immunosorbent assay (ELISA) is a low-cost, rapid and portable immunological detection method. It does not require high sample purity and is easy to operate. It is suitable for on-site rapid detection of a large number of samples. Therefore, establishing an efficient immunological detection method and screening high-specificity monoclonal antibodies is an important prerequisite.

Acetaminophen (Paracetamol), also known as Tylenol, Panadol, Bufferin, and Paracetamol, is a metabolite of phenacetin in the body, which regulates central prostaglandin synthase by inhibiting hypothalamic body temperature, reduce the synthesis and release of prostaglandins PGE1, bradykinin and histamine. But so far, there is no relevant report on the use of enzyme-linked immunosorbent assay for the detection of phenacetin.

SUMMARY OF THE INVENTION

In order to overcome the deficiencies in the prior art, the object of the invention is to obtain an anti-phenacetin monoclonal antibody hybridoma cell strain AD and its preparation method and application. The detection sensitivity can be used to establish an immunological detection method for phenacetin.

To achieve the above object, the technical scheme adopted in the present invention is as follows:

An object of the present invention is to provide an anti-phenacetin monoclonal antibody hybridoma cell strain AD. The hybridoma cell strain has been preserved at the China General Microbiological Culture Collection Center (Address: No. 3, #1 Yard, Beichen West Road, Chaoyang District, Beijing) on Apr. 23, 2020 with CGMCC No. 19681.

Another object of the present invention is to provide a preparation method of anti-phenacetin monoclonal antibody hybridoma cell strain AD. The anti-phenacetin monoclonal antibody hybridoma cell strain AD is established after immunizing mice with phenacetin complete antigen through cell fusion and culturing in HAT selective medium. The phenacetin complete antigen-immunized mice were obtained by immunizing mice with Phe-BA-BSA immunogen.

Further, the complete phenacetin antigen is obtained by coupling a Phe-BA hapten with a carrier protein, wherein the carrier protein includes bovine serum albumin (BSA) and ovalbumin (OVA); Phenacetin immunogens include Phe-BA-BSA, Phe-BA-OVA. The Phe-BA hapten is obtained by hydrolysis of the product of the reaction between acetaminophen and ethyl 4-bromobutyrate. Ethyl 4-bromobutyrate is a commonly used intermediate in pesticide/pharmaceutical synthesis. Paracetamol has a similar structure to phenacetin and has a high reactive site, and can obtain a hapten with a high reaction rate with ethyl 4-bromobutyrate. The structural formula of the Phe-BA hapten is as follows:

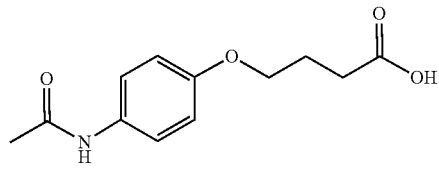

Phe-BA

Taking Phe-BA-BSA immunogen as an example, the basic steps are as follows:

(1) Preparation and identification of immunogen: Phe-BA was obtained by hydrolysis of the reaction product of acetaminophen and ethyl bromobutyrate. Using the Phe-BA as the hapten, the hapten is coupled with carrier proteins including BSA and OVA by the carbodiimide method to prepare the immunogen and the coating original. The complete antigen and the unconjugated small molecule hapten are separated by dialysis, and the isolated complete antigen is the phenacetin immunogen and the coating original. Among them, the immunogen Phe-BA-BSA was used to prepare hybridoma cell lines by immunizing mice. Coated with the original Phe-BA-OVA for subsequent detection by the kit.

(2) Immunization of mice: Immunization of mice using Freund's adjuvant, incomplete Freund's adjuvant, Phe-BA-BSA immunogen by subcutaneous injection of albino laboratory mice (BALB/c mice) in the nape of the neck to obtain phenacetin immunized mice. For the first immunization (100 μg/only), an equal volume of mixed emulsion of Freund's complete adjuvant and phenacetin immunogen was used as an injection. For several boosting immunizations, an equal volume emulsion of incomplete Freund's adjuvant and phenacetin immunogen was used as an injection. One month between the first immunization and the first booster immunization, and 21 days between multiple booster immunizations. The last sprint immunization was performed with 50 μL of water diluted to 0.5 mg/mL Phe-BA-BSA immunogen (25 μg/only, no adjuvant). Serum titers and inhibition rates were detected by indirect competitive enzyme-linked immunosorbent assay (icELISA). The number of booster immunizations is 4 to 6 times, preferably 5 times.

(3) Cell fusion and cell strain establishment: The splenocytes of phenacetin-immunized mice were fused with myeloma cells by polyethylene glycol (PEG4000) method, cultured in HAT medium, and positive cell wells were detected by indirect ELISA. The inhibitory effect of the positive cell wells was further determined by icELISA, and the positive cell wells with the best inhibition were subcloned three times by limiting dilution method, finally, the hybridoma cell strain AD was obtained by screening.

(4) Identification of the properties of hybridoma cell strain: Antibody subtypes were identified by mouse monoclonal antibody immunocolloidal gold subtype kit method, and $IC_{50}$ values, cross-reactivity rates and affinity constants were determined by ELISA.

Further, the preparation method of the Phe-BA hapten is as follows: Calculate by molar ratio: dissolve 1 equ. acetaminophen in dimethyl sulfoxide, then add 4-6 equ. $K_2CO_3$, add 2-5 equ. ethyl 4-bromobutyrate under stirring, and heat to reflux at about 100° C. (80~120° C.). When the reaction is complete, the mixture was cooled down to room temperature and concentrated. The NaOH solution was added into the concentrated solution. The mixture was heated to 70~80° C. under stirring for 1 h., Then, the pH of the mixture was adjusted to 4~5 with HCl when the solution was cooled down to room temperature. The solution was then washed with ethyl acetate three times, and the organic phase was collected, concentrated and purified. A white solid obtained and dried, which is the hapten Phe-BA.

Another object of the present invention is to provide an anti-phenacetin monoclonal antibody, which is obtained from the anti-phenacetin monoclonal antibody hybridoma cell strain with the deposit number of CGMCC19681—Monoclonal cell strain AD secretion.

Another object of the present invention is to provide an application of the above-mentioned anti-phenacetin monoclonal antibody for preparing a detection subject for the analysis and detection of phenacetin residues in food safety detection. The detection subject includes reagents, detection plates, and kits.

Further, the detection subject also includes a phenacetin coating antigen, which is obtained when the Phe-BA hapten is coupled with a carrier protein to prepare a phenacetin immunogen. Wherein, the carrier protein includes bovine serum albumin BSA, ovalbumin OVA; phenacetin coating source includes Phe-BA-BSA, Phe-BA-OVA. When the phenacetin immunogen is Phe-BA-BSA, the corresponding phenacetin coating antigen is preferably Phe-BA-OVA, which has better specificity and detection sensitivity.

Beneficial effects of the present invention: The monoclonal antibody secreted by the cell strain AD provided by the present invention has good specificity and detection sensitivity to phenacetin ($IC_{50}$ value is 3.0 μg/L). The detection of the phenacetin residue can be realized, and the raw material is provided for the immunodetection of the phenacetin residue in the food, which has practical application value.

BRIEF DESCRIPTION THE DRAWINGS

DETAILED DESCRIPTION OF PREFERRED EMBODIMENTS OF THE INVENTION

Figure 1:
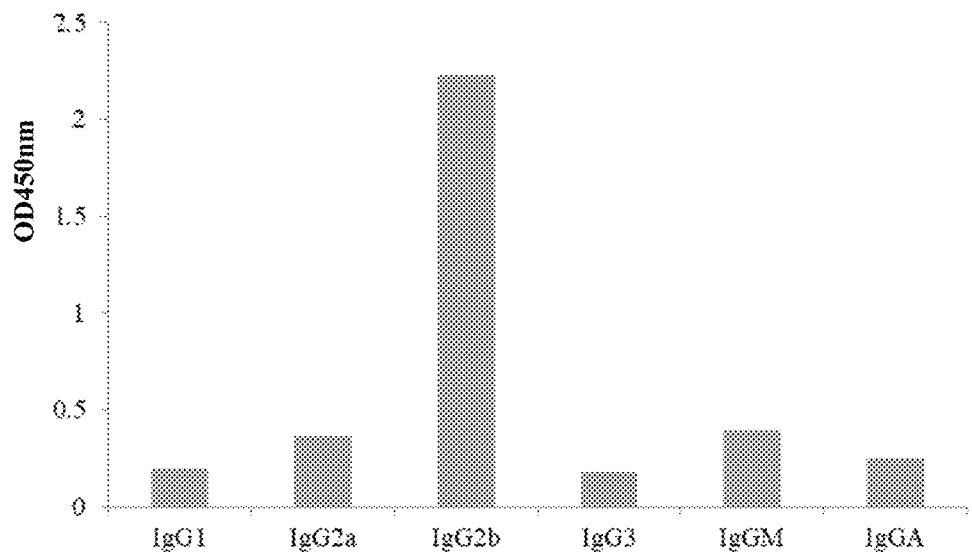
FIG. 1 is the subtype identification of monoclonal antibody AD.

The present invention will be further described below with reference to the accompanying drawings and embodiments.

EXAMPLE

The present invention can be better understood from the following examples. However, those skilled in the art can easily understand that the specific material ratios, process conditions and results described in the examples are only used to illustrate the present invention and should not and will not limit the present invention described in detail in the claims.

In the present invention, the mice immunized with the phenacetin complete antigen are subjected to cell fusion, cultured in a HAT selective medium, and the cell supernatant is screened by icELISA, and finally a monoclonal antibody hybridoma cell strain with high sensitivity to phenacetin is obtained.

1. Synthesis of Hapten (1) Synthesis of Hapten Phe-BA:

The synthetic route is as follows:

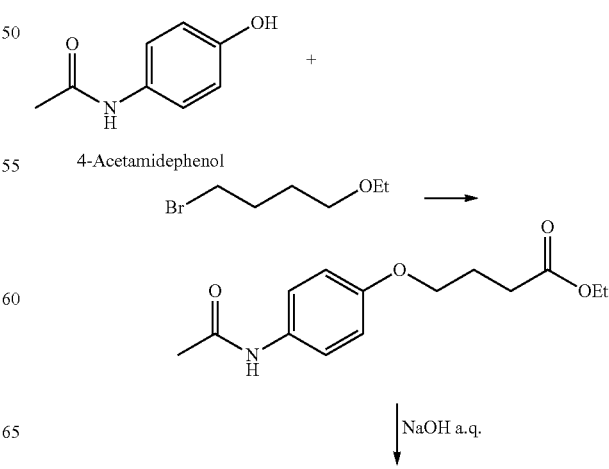

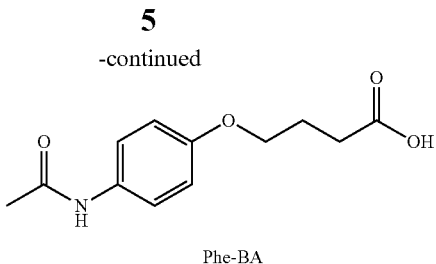

Phe-BA

Dissolve 0.20 g of acetaminophen in 2 mL of dimethyl sulfoxide, add 1.0 g of $K_2CO_3$, and stir for 0.5 h. Then, 0.77 g of ethyl 4-bromobutyrate was added under stirring. The mixture was heated to reflux at 110° C. for 24 h, and monitored by TLC. When the reaction is complete, stop heating and concentrated until the temperature of the reaction solution cooled down to room temperature; Then, 2 mL of 1 mol/L NaOH was added into the above solution, heating to 80° C. for 1 h under stirring. When the temperature calmed down to room temperature, the reaction solution which was adjusted to pH 4 with 1.0 mol $L^{-1}$ aqueous HCl., The solution was then washed with ethyl acetate three times, and the organic phase was collected, dried over anhydrous $Na_2SO_4$ and concentrated., After purification by silica gel column and concentration, a white solid was obtained, that is the hapten Phe-BA.

2. Preparation of Complete Antigen: The Hapten Phe-BA Prepared in the Above Step 1 is Coupled with Bovine Serum Albumin (BSA) to Obtain the Complete Antigen Phe-BA-BSA.

The preparation method of the complete antigen Phe-BA-BSA is as follows:

a. 2.85 mg of the hapten Phe-BA obtained in step (1) was dissolved in 200 μL of anhydrous N,N-dimethylformamide, and then 1.6 mg of 1-ethyl-(3-dimethylaminopropyl) carbodiimide hydrochloride (EDCI) and 1.0 mg of N-hydroxysuccinimide (NHS) were added, and then the mixture was stirred at room temperature for 0.5 h to obtain liquid A. In addition, 10 mg of bovine serum albumin (BSA) was dissolved in 2 mL of boric acid buffer solution to obtain solution B. Then, the solution A was slowly added dropwise to solution B with constant stirring at room temperature for 2 h to obtain a mixture containing Phe-BA-BSA.

b. Dialysis: The 10 cm dialysis bag was boiled in boiling water for 5 min, rinsed with deionized water at 60° C. for 3 min, and stored in deionized water at 4° C. for later use. The mixed solution containing Phe-BA-BSA in step (a) was placed in a dialysis bag, and 0.01 mol/L PBS was used as the dialysate, dialyzed at 4° C. for 3 d, and the dialysate was replaced three times a day to separate the complete antigen and unconjugated haptens and other small molecules. The complete antigen includes immunogen and coating antigen; wherein, the immunogen Phe-BA-BSA is used for the next step of mouse immunization; the coating antigen is used for the detection in the subsequent step 7.

In the same way, the complete antigen Phe-BA-OVA is obtained by coupling the hapten Phe-BA and ovalbumin (OVA), including the immunogen and the coating antigen. The immunogen is used for the next step of mouse immunization, and the coating antigen is used for the detection in the subsequent step 7.

In the present Experimental example, the subsequent immunization and detection-related steps are specifically described by using the immunogen Phe-BA-BSA and the coating original Phe-BA-OVA as examples.

3. Immunization of Mice: The Injection was Formed by Emulsification of Phe-BA-BSA Immunogen Mixed with an Equal Volume of Freund's Adjuvant, and Subcutaneously Injected into BALB/c Mice Through the Back of the Neck.

For the first immunization (100 μg/only), an equal volume of mixed emulsion of Freund's complete adjuvant and phenacetin immunogen was used as an injection. For 5 boosting immunizations, an equal volume emulsion of incomplete Freund's adjuvant and phenacetin immunogen was used as an injection. One month between the first immunization and the first booster immunization, and 21 days between multiple booster immunizations. The last sprint immunization was performed with 50 μL of water diluted to 0.5 mg/mL Phe-BA-BSA immunogen (25 μg/only, no adjuvant). Serum titers and inhibition rates were detected by indirect competitive enzyme-linked immunosorbent assay (icELISA).

4. Cell Fusion

Three days after the rush immunization, cell fusion is carried out according to the conventional PEG method. The specific steps are as follows:

a. The eyeballs were removed to collect blood, and the Phe-BA-BSA-immunized mice were killed by cervical dislocation, and then immediately put into 75% alcohol for disinfection and soaked for about 5 minutes. The spleen of the mouse was aseptically removed, moderately ground with the tip of a syringe and passed through a 200-mesh cell screen to obtain a spleen cell suspension. The suspension was collected, centrifuged (1200 rpm, 8 min), and the splenocytes were washed three times with RPMI-1640 medium. After the last centrifugation, the splenocytes were diluted to a certain volume, counted, and used for later use.

b. Collection of murine myeloma SP2/0 cells: 7-10 days before cell fusion, SP2/0 tumor cells were cultured in RPMI-1640 medium containing 10% FBS (fetal bovine serum) in a 5% $CO_2$ incubator. Before fusion, the number of SP2/0 tumor cells was required to reach $1 \sim \times 10^7$, to ensure that the SP2/0 tumor cells were in the logarithmic growth phase before fusion. At fusion, tumor cells were collected, suspended in RPMI-1640 basal medium, and counted.

c. The fusion process was 7 min. The first minute, 1 mL of PEG 1500 was added dropwise to the cells from slow to fast; the second minute, let stand. On the 3rd and 4th minutes, drop 1 mL of RPMI-1640 medium within 1 minute; on the 5th and 6th minutes, dropwise add 2 mL of RPMI-1640 medium within 1 minute; on the 7th minute, every 10 s Add 1 mL of RPMI-1640 medium dropwise. Then, the above cell mixture was placed in a 37° C. warm bath for 5 min, centrifuged (800 rpm, 8 min), and the supernatant was discarded to obtain a precipitate. The solution is centrifuged and then suspended in an RPMI-1640 screening medium containing 20% fetal bovine serum and 2% 50×HAT, and then added to a 96-well cell culture plate and cultured in an incubator at 37° C. in a 5% $CO_2$ atmosphere.

5. Cell Screening and Cell Strain Establishment

The medium of the fused cells is semi-changed with an RPMI-1640 screening medium on the third day of cell fusion, and then completely changed with an RPMI-1640 transition medium containing 20% fetal bovine serum and 1% 100×HT on the 5th day. The cell supernatant is taken for screening on the 7th day.

The screening is divided into two steps: the first step is to select positive cell wells by icELISA, the second step is to use the phenacetin as a standard and measure the inhibitory effect of the positive cells by icELISA. Cell wells with a good inhibitory effect to the phenacetin standard are selected and subcloned by a limiting dilution method. The same method is used for detection and repeat three times to obtain a cell strain AD.

5. Preparation and Identification of Anti-Phenacetin Monoclonal Antibody 8-10 weeks old BALB/c mice are taken and each intraperitoneally injected with 1 mL of sterile paraffin oil, and 7 days later, intraperitoneally injected with a $1 \times 10^6$ hybridoma cell strain; ascites is collected from the 7th day and purified by an octanoic acid-ammonium sulfate method. The purified anti-phenacetin monoclonal antibody was finally obtained and stored at −20° C.

Using the mouse monoclonal antibody subtype identification kit to identify the immunoglobulin subtype of the anti-phenacetin monoclonal antibody purified from ascites, its subtype is IgG2b type, and it was detected by the mouse monoclonal antibody subtype identification kit. The chain type is the kappa type, as shown in FIG. 1.

Figure 2:
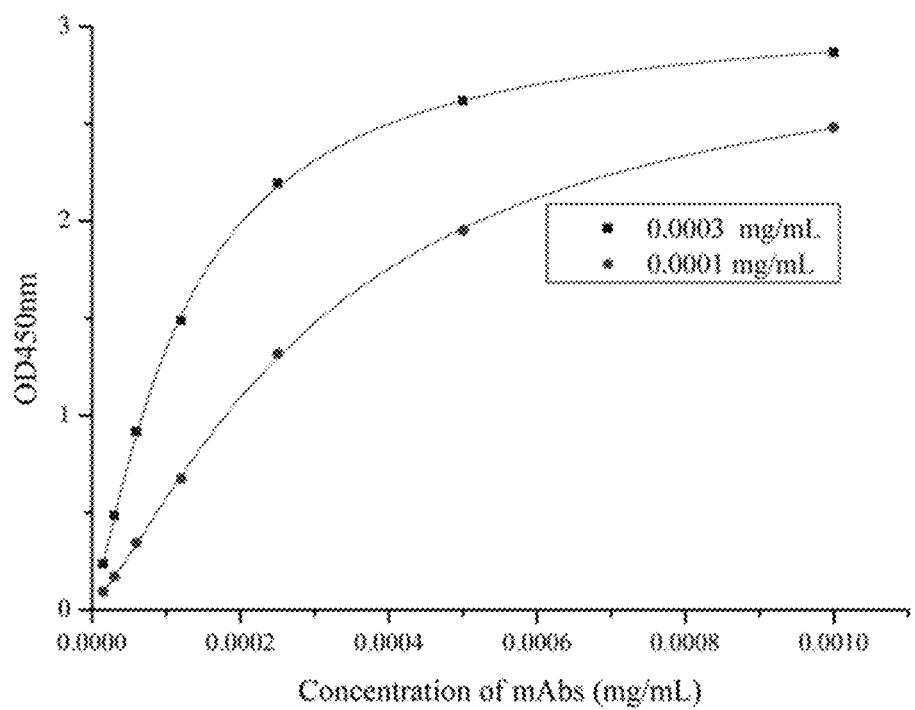
FIG. 2 is the affinity determination of monoclonal antibody AD.
Figure 3:
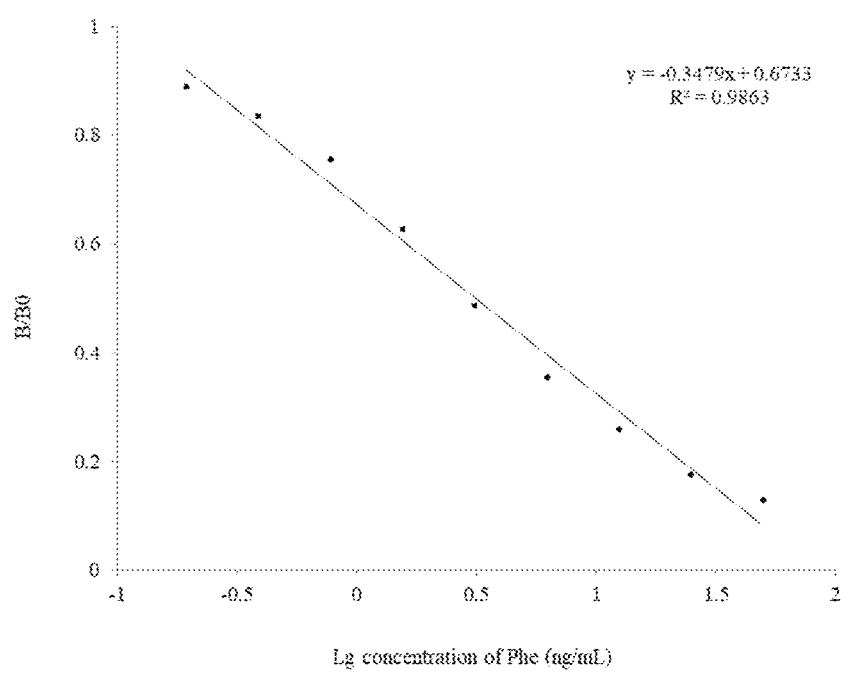
FIG. 3 is a standard curve for the inhibition of phenacetin by monoclonal antibody AD.

The affinity of anti-phenacetin monoclonal antibody determined by indirect ELISA was $5.36 \times 10^8$ L/mol, as shown in FIG. 2. The sensitivity to phenacetin was detected by icELISA, as shown in FIG. 3. According to the standard equation y=−0.3479 x+0.6733 ($R^2$=0.9863), the $IC_{50}$ was calculated to be 3.0 μg/L.

The above results show that the prepared anti-phenacetin monoclonal antibody has high affinity and sensitivity and can be used for phenacetin immunoassay detection and the preparation of affinity columns.

7. Antibody Application

The anti-phenacetin monoclonal antibody prepared by the hybridoma cell strain AD through in vivo ascites was applied to the addition and recovery test of phenacetin, and the specific steps were as follows:

7.1 Coating: The coating antigen Phe-BA-OVA obtained in the previous step 2 was diluted to 0.1 μg/mL with 0.05 mol L−1 pH 9.6 carbonate buffer, 100 μL/well, at 37° C. for 2 h.

7.2 Washing: The solution in the plate was poured out and washed three times with washing solution, 3 min each time.

7.3 Closure: the plate is closed with blocking solution, 200 μL per well, at 37° C. for 2 h; the plate is washed and dried for later use;

7.4 Add sample:

100 μL of PBS was added to the positive control wells; 100 μL of phenacetin standard solution with a concentration of 0.3~50 μg/L was added to the detection wells. Then, the anti-phenacetin monoclonal antibody was diluted with 0.01 mol $L^{-1}$ PBS to 0.1 g/mL, and added to the coated wells of each dilution, 100 μL/well, and reacted at 37° C. for 30 min; Then the plate is thoroughly washed. 100 μL of HRP-goat anti-mouse IgG diluted at a ratio of 1:3000 is added to each well and reacts at 37° C. for 30 min.

7.5 Color rendering: The ELISA plate was taken out, washed thoroughly, added 100 μL of TMB color developing solution to each well, and reacted at 37° C. for 15 min in the dark.

7.6 Termination and determination: 50 μL of stop solution was added to each well to stop the reaction, and then the OD450 value of each well was measured with a microplate reader.

The $IC_{50}$ of anti-phenacetin monoclonal antibody determined by icELISA was 3.0 μg/L. It shows that it has high sensitivity to phenacetin and can be used for phenacetin immunoassay detection.

In the above steps, the configuration of each solution is as follows:

Carbonate buffer solution (CBS): 1.59 g of $Na_2CO_3$ and 2.93 g of $NaHCO_3$ are weighed and separated dissolved in a small amount of double distilled water; the two solutions are mixed; double distilled water is added to the mixed solution till about 800 mL and the mixed solution is mixed to be uniform; the pH is adjusted to 9.6, and double distilled water is added till the mixed solution reaches 1000 mL and the obtained solution is stored at 4° C. for later use.

Phosphate buffer solution (PBS): 8.00 g of NaCl, 0.2 g of KCl, 0.2 g of $KH_2PO_4$, 2.9 g of $Na_2HPO_4 \cdot 12H_2O$ are dissolved in 800 mL of pure water, the pH is adjusted to 7.2-7.4 with NaOH or HCl, and the solution is maintained at a constant volume of 1000 mL.

PBST: PBS Containing 0.05% Tween 20.

TMB developing solution: Solution A: 18.43 g of $Na_2HPO_4.12H_2O$ and 9.33 g of citric acid are added with pure water to 100 mL; B solution: 60 mg of TMB is dissolved in 1000 mL of ethylene glycol. The solution A and the solution B are mixed at a ratio of 1:5 to obtain TMB (a developing solution, mixed when necessary).

The above is only the preferred embodiment of the invention. It should be pointed out that for ordinary technicians in the technical field, several improvements and refinements can be made without departing from the principle of the invention, and these improvements and refinements should also be regarded as the protection scope of the invention.

The referenced hybridoma cell strain AD (CGMCC No. 19681) was deposited on Apr. 23, 2020, in the China General Microbiological Culture Collection Center (CGMCC) and is identified by Accession Number of CGMCC No. 19681.

The China General Microbiological Culture Collection Center (CGMCC), which is located at No. 3, Yard. 1, Beichen West Road, Chaoyang District, Beijing, China, 100101, is an International Depository Authority under the provisions of the Budapest Treaty.

The referenced deposit was made under the provisions of the Budapest Treaty. The deposits will be replaced by Applicant if they should become non-viable or non-replicable.

(i) During the pendency of this application, access to the invention will be afforded to the Commissioner upon request;

(ii) all restrictions upon availability to the public will be irrevocably removed upon granting of the patent based on this application, with Applicant reserving the right to employ the reporting conditions allowed by the patent owner as expressly recited within 37 C.F.R. § 1.808(b), pursuant to 37 C.F.R. § 1.808(a)(2);

(iii) the deposit will be maintained in a public depository for a period of 30 years or 3 years after the last request or for the effective life of the patent, whichever is longer;

(iv) a test of the viability of the biological material at the time of deposit was performed in accordance with 37 C.F.R. § 1.807; and (v) the deposit is capable of reproduction under 37 C.F.R. § 1.806.

What is claimed is:

1. A hybridoma cell strain AD with anti-phenacetin monoclonal antibody, deposited at the China General Microbiological Culture Collection Center with Accession Number CGMCC No. 19681.

2. An anti-phenacetin monoclonal antibody secreted by the monoclonal hybridoma cell strain AD of claim 1.

3. A method for analyzing and detecting phenacetin residues in food comprising:

adding the an anti-phenacetin monoclonal antibody of claim 2 to a subject to form a detection subject, and using the detection subject for analyzing and detecting phenacetin residues in a food sample, wherein the detection subject is a reagent, a detection plate, or a kit.

* * * * *